United States Patent
Ekambaram et al.

(10) Patent No.: US 11,074,324 B2
(45) Date of Patent: Jul. 27, 2021

(54) PREVENTING SOFTWARE APPLICATION TAMPERING

(71) Applicant: INTERNATIONAL BUSINESS MACHINES CORPORATION, Armonk, NY (US)

(72) Inventors: Vijay Ekambaram, Chennai (IN); Padmanabha Venkatagiri Seshadri, Mysore (IN); Vijay Kumar Ananthapur Bache, Bangalore (IN); Jhilam Bera, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 16/122,298

(22) Filed: Sep. 5, 2018

(65) Prior Publication Data

US 2020/0074049 A1    Mar. 5, 2020

(51) Int. Cl.
*G06F 21/14*     (2013.01)
*G06F 8/51*     (2018.01)
(Continued)

(52) U.S. Cl.
CPC .......... *G06F 21/14* (2013.01); *G06F 8/51* (2013.01); *G06F 8/72* (2013.01); *G06F 8/75* (2013.01); *G06F 8/76* (2013.01)

(58) Field of Classification Search
CPC ... G06F 21/14; G06F 8/76; G06F 8/75; G06F 8/51; G06F 8/72
(Continued)

(56) References Cited

U.S. PATENT DOCUMENTS

| 7,958,554 B2 * | 6/2011 | Chow | G06F 21/14 726/22 |
| 8,278,948 B2 | 10/2012 | Johnson | |

(Continued)

FOREIGN PATENT DOCUMENTS

| EP | 1309905 A2 | 5/2003 |
| EP | 2450792 A1 | 5/2012 |

(Continued)

OTHER PUBLICATIONS

Yan et al., "SplitDroid: Isolated Execution of Sensitive Components for Mobile Applications", Software Engineering Institute, Peking University, Accessed Aug. 16, 2018, 18 pages, <http://sei.pku.edu.cn/~yaoguo/papers/Yan-SecureComm-15.pdf>.

(Continued)

*Primary Examiner* — Jahangir Kabir
(74) *Attorney, Agent, or Firm* — William Hartwell; Andrew D. Wright; Roberts, Calderon, Safran & Cole, P.C.

(57) ABSTRACT

Systems and methods for preventing software application tampering are disclosed. 1. In embodiments, a computer-implemented method includes: identifying, by a computing device, an IP related software code segment of a software application; segregating, by the computing device, the IP related software code segment into one or more native code clusters and one or more non-native code clusters; refactoring, by the computing device, the one or more non-native code clusters into one or more stand-alone portable components (SPCs); determining, by the computing device, code migration scores for the one or more SPCs; and determining, by the computing device, select SPCs from the one or more SPCs to migrate to a remote security server based on the code migration scores.

20 Claims, 7 Drawing Sheets

(51) Int. Cl.
*G06F 8/72* (2018.01)
*G06F 8/75* (2018.01)
*G06F 8/76* (2018.01)

(58) Field of Classification Search
USPC .................................................. 726/26, 27
See application file for complete search history.

(56) References Cited

U.S. PATENT DOCUMENTS

| | | |
|---|---|---|
| 2013/0170107 A1 | 7/2013 | Dean |
| 2013/0268997 A1 | 10/2013 | Clancy, III et al. |
| 2015/0261766 A1* | 9/2015 | Apte .................. G06F 16/1727 |
| | | 707/654 |
| 2016/0180065 A1 | 6/2016 | Yi et al. |
| 2017/0046143 A1* | 2/2017 | Kochhar ............... G06F 16/214 |
| 2019/0250912 A1* | 8/2019 | Gavisiddappa Kodigenahalli ...... |
| | | G06F 8/20 |

FOREIGN PATENT DOCUMENTS

| | | |
|---|---|---|
| WO | 1998010611 A3 | 3/1998 |
| WO | 2008054849 A2 | 5/2008 |
| WO | 2013074041 A1 | 5/2013 |

OTHER PUBLICATIONS

"Shrink your code and resources", Android Developers, <https://developer.android.com/studio/build/shrink-code>, Accessed Aug. 28, 2018, 9 pages.

"Hybrid Cloud Solutions", Hewlett Packard Enterprise, <https://www.hpe.com/us/en/solutions/cloud.html>, accessed Aug. 28, 2018, 14 pages.

Marforio et al., "Smartphones as Practical and Secure Location Verication Tokens for Payments", Institute of Information Security, Feb. 24, 2014, 48 pages.

Graa et al., "Protection against Code Obfuscation Attacks based on control dependencies in Android Systems", HAL archives-ouvertes.fr, Jun. 20, 2014, 10 pages.

Mishne et al., "Source Code Retrieval using Conceptual Similarity", Language & Inference Technology Group University of Amsterdam, Apr. 26, 2004, 16 pages.

* cited by examiner

PREVENTING SOFTWARE APPLICATION TAMPERING

BACKGROUND

The present invention relates generally to software security and, more particularly, to preventing software application tampering.

Various mobile device applications can be reverse engineered in order to obtain source code of the applications. Owners of mobile device applications have an interest in protecting intellectual property (IP) embodied in the source code of the applications. One security measure that can be taken to protect source code is to encrypt software applications. Other methods have been developed in an attempt to prevent reverse engineering of mobile application software, including tools for obfuscating code to make the code difficult to read, migrating code to the cloud, and run time code generation.

SUMMARY

In an aspect of the invention, a computer-implemented method includes: identifying, by a computing device, an IP related software code segment of a software application; segregating, by the computing device, the IP related software code segment into one or more native code clusters and one or more non-native code clusters; refactoring, by the computing device, the one or more non-native code clusters into one or more stand-alone portable components (SPCs); determining, by the computing device, code migration scores for the one or more SPCs; and determining, by the computing device, select SPCs from the one or more SPCs to migrate to a remote security server based on the code migration scores.

In another aspect of the invention, there is a computer program product including a computer readable storage medium having program instructions embodied therewith. The program instructions are executable by a computing device to cause the computing device to: identify hardware data inputs utilized by an original software application comprising one or more native code clusters and one or more non-native code clusters located on a remote security server in communication with the computing device; add retrieval application programing interfaces (APIs) in a native library of the computing device for each of the hardware data inputs; and transform the original software application to a modified software application, wherein hardware data inputs are called through the native library of the computing device during an execution of the modified software application.

In another aspect of the invention, there is a system including: a processor, a computer readable memory and a computer readable storage medium associated with a computing device; program instructions to identify an IP related software code segment of a software application; program instructions to segregate the IP related software code segment into one or more native code clusters and one or more non-native code clusters; program instructions to refactor the one or more non-native code clusters into one or more stand-alone portable components (SPCs); program instructions to determine code migration scores for the one or more SPCs; and program instructions to determine select SPCs from the one or more SPCs to maintain in a cloud environment separate from the one or more native code clusters based on the code migration scores. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
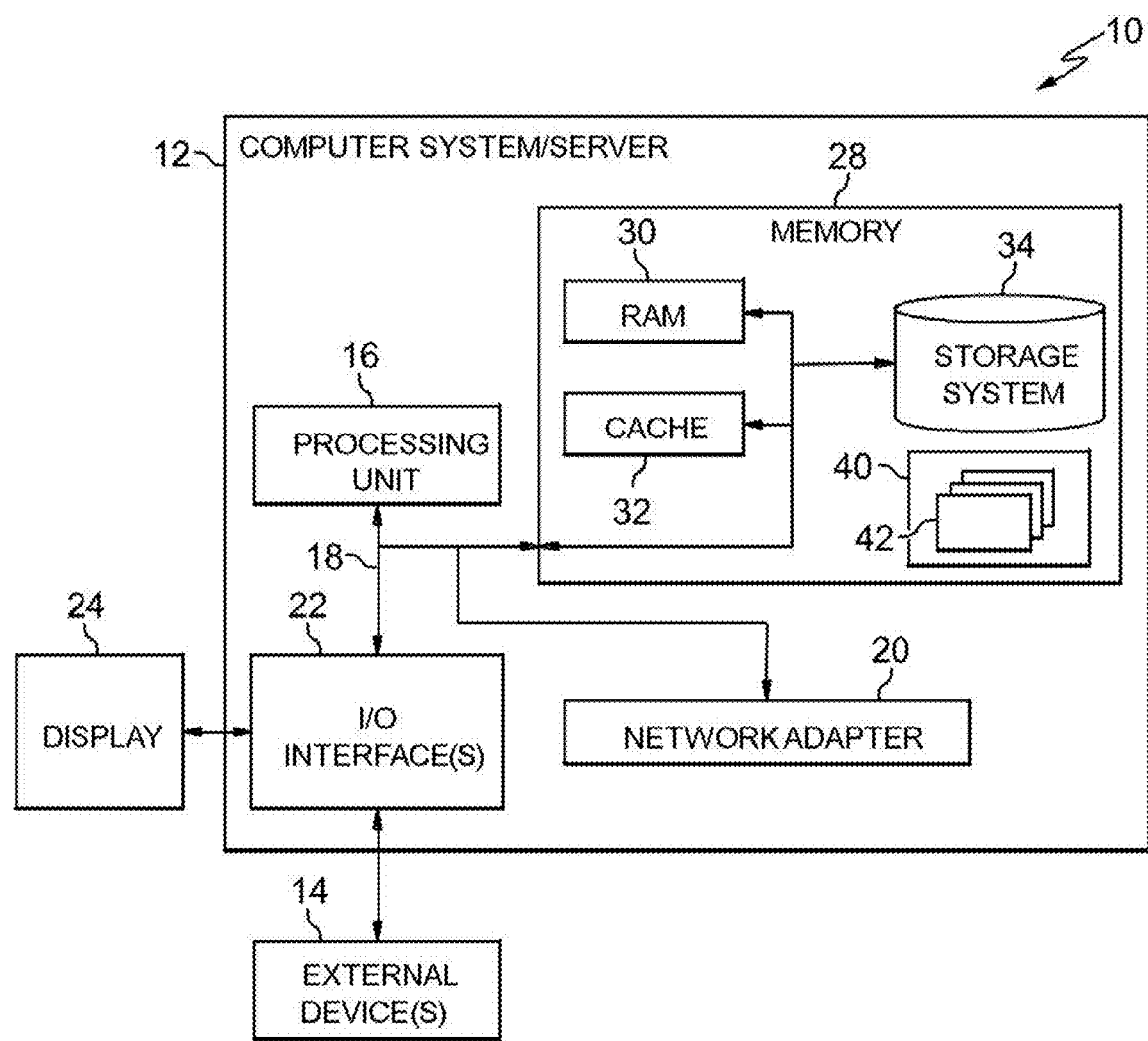
FIG. 1 depicts a computing infrastructure according to an embodiment of the present invention.

The present invention relates generally to software security and, more particularly, to preventing software application tampering. Various security measures have been attempted to prevent reverse engineering of software applications, including encryption of software. However, a hacker who obtains the application's software code from a device memory, where it is running in a decrypted form during application execution, may breach even encrypted applications and automated hacking tools have been developed for this purpose. Most software code (including IP) in mobile applications is algorithmic oriented. Accordingly, in order to effectively protect the software code, the inputs (e.g., global positioning system, accelerometer, etc.) used by the algorithm, as well as the computations involved in the algorithm, must be protected.

In embodiments, systems and methods of the present invention transform intellectual property (IP) related software code by segregating the IP related code, sending part of the IP related code to a native layer, and sending the remaining IP related code to the cloud (i.e., a security server accessible through a network connection), wherein input retrieval application program interfaces (APIs) are identified and transferred to the native layer. In aspects, IP related code is migrated to the cloud based on trade-offs between performance loss scores (PLSs) and IP gain scores (IPGS).

Advantageously, methods of the present invention provide a technical solution to the technical problem of reverse engineered software code via device tampering. Specifically, embodiments of the invention provide an improved method of providing tamper resistant software code, wherein neither software code in a native layer nor software code in a cloud can be reverse engineered. Further, aspects of the invention constitute an improvement over existing code obfuscation methods, as they avoid the technical problem of performance overhead due to code obfuscation. That is, executing application code at the native layer in accordance with embodiments of the invention improves the performance of the application over other security solutions requiring code obfuscation. Moreover, embodiments of the invention constitute improvements to a computing device. More specifically, embodiments of the invention transform computer code to cause the computing device to execute an application in a new way to obtain a new, more secure, result.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
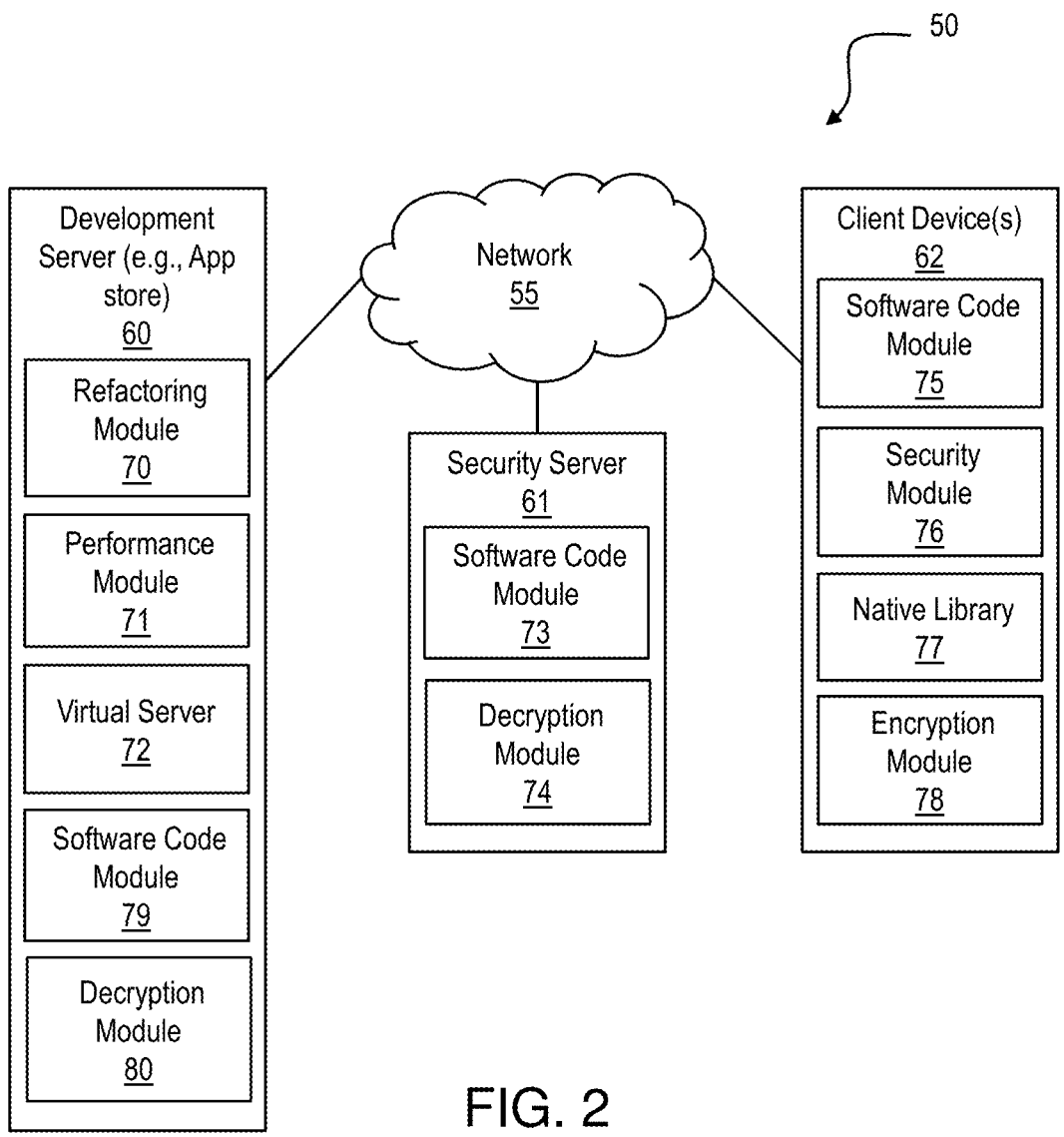
FIG. 2 shows an exemplary environment in accordance with aspects of the invention.

FIG. 2 shows an exemplary anti-tampering environment 50 in accordance with aspects of the invention. The anti-tampering environment 50 includes a network 55 connecting a development server 60 with a security server 61 and a client device 62. In aspects, the development server 60 comprises a computer system 12 of FIG. 1, and is connected to the network 55 via the network adapter 20 of FIG. 1. In embodiments, the development server 60 is configured as a special purpose computing device that is part of a software distribution system. For example, the development server 60 may be configured to modify software applications (e.g., mobile device apps) for use by the client device 62 with security services (software anti-tampering services) provided by the security server 61.

The network 55 may be any suitable communication network or combination of networks, such as a local area network (LAN), a general wide area network (WAN), and/or a public network (e.g., the Internet). In embodiments, the user computer device 62 is in the form of the computing device 12, and may be any user device that runs software applications, such as a desktop computer, laptop computer, tablet computer, smartphone, etc. In embodiments, security server 61 is in the form of the computing device 12 of FIG. 1, and may be a special purpose computing device providing anti-tampering services to the user computer device 62 to prevent reverse engineering of software code run on the user computer device 62.

Still referring to FIG. 2, the development server 60 includes one or more modules configured to perform one or more of the functions described herein, (e.g., program module 42 of FIG. 1 executed by the development server 60). In embodiments, the development server 60 includes a refactoring module 70 configured to: convert IP related code segments of a software application into a syntax tree, including information about data and data control flow of the application; segregate the IP related software code segments into a native code cluster and a non-native code cluster; identify and define interactions between the native code cluster and the non-native code cluster; and refactor the non-native code cluster as stand-alone portable components (SPC) with stubs. In embodiments, the development server 60 comprises a performance module 71 configured to determine code migration scores for SPCs generated by the refactoring module 70. In aspects, the performance module 71 pushes SPCs to a virtual server 72; derives performance loss scores (PLSs) due to the migration of the SPCs to the virtual server 72; and determines an IP gain score (IPGS) by comparing the SPCs to code segments in an open source repository using conceptual similarity code representation. In embodiments, the refactoring module 70 is configured to determine final SPCs to migrate to a security server (e.g., security server 61) based on the code migrations scores generated by the performance module 71; refractor the final SPCs with stubs; and send the final SPCs to the security server (e.g., security server 61).

With continued reference to FIG. 2, the security server 61 includes one or more modules configured to perform one or more of the functions described herein, (e.g., program module 42 of FIG. 1 executed by the security server 61). In embodiments, the security server 61 includes a software code module 73 configured to receive and store SPCs and any related information (e.g., identification of the software application, etc.) from the development server 60. In aspects, the security server 61 includes a decryption module 74 configured to receive encrypted input data from an encryption module 78 of a client device 62 during the running of an application on the client device 62, decrypt the input data, and perform functions based on the decrypted input data at the security server 61.

In embodiments, the client device 62 of the anti-tampering environment 50 includes one or more modules configured to perform one or more of the functions described herein, (e.g., program module 42 of FIG. 1 executed by the client device 62). In aspects, the client device 62 includes a software code module 75 configured to receive, store and execute software applications. In embodiments, the client device 62 includes a security module 76 configured to identify hardware data inputs utilized by an original software application; add a retrieval application programming interface (API) in the native library 77 for each input to retrieve respective input values; and transform the original software application to a modified software application wherein the data inputs are called through the native library 77 (not through the Java public APIs) during running of the software application. In embodiments, the client device 62 includes an encryption module 78 configured to encrypt input data at the native layer, wherein the decryption module 74 is configured to decrypt the input data.

In some embodiments, the development server 60 acts as a security server. In such embodiments, the development server 60 includes: a software code module 79 configured to receive and store SPCs and any related information (e.g., identification of the software application, etc.) from the development server 60; and a decryption module 80 configured to receive encrypted input data from a software code module 75 of a client device 62 during the running of an application on the client device 62, decrypt the input data, and perform functions based on the decrypted input data at the development server 60.

The anti-tampering environment 50 may include additional or fewer components than those shown in FIG. 2. Separate components may be integrated into a single computing component or module. Additionally, or alternatively, a single component may be implemented as multiple computing components or modules. For example, the security module 76 and encryption module 78 of the client device 62 may be incorporated into the same module.

Figure 3:
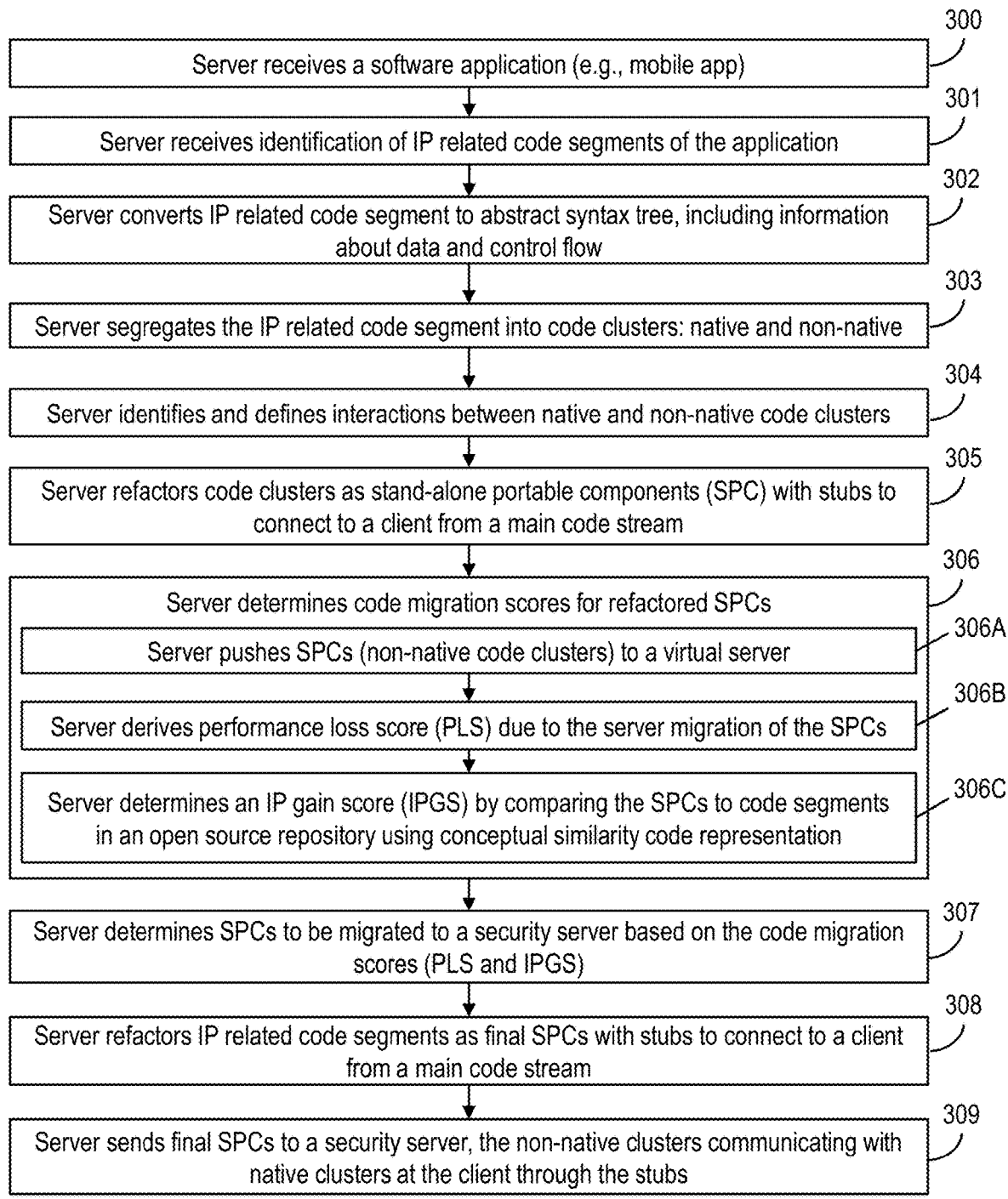
FIG. 3 shows a flowchart of steps of a method implemented by a server in accordance with aspects of the invention.

FIG. 3 shows a flowchart of steps of a method implemented by a server in accordance with aspects of the invention. Steps of the method of FIG. 3 may be performed in the environment illustrated in FIG. 2, and are described with reference to elements shown in FIG. 2.

At step 300, the development server 60 receives a software application (software application of interest). The development server 60 may receive the software application from any source, such as a software developer, software distributor, user device (e.g., client device 62), etc. In embodiments, the software application is a mobile device application (i.e., mobile app).

At step 301, the development server 60 receives identification of IP related code segments of the software application of interest received at step 300. The term IP related code segment as used herein refers to segments of software code that embody intellectual property of an owner (i.e., code the owner wishes to retain exclusive rights to use, sell or license). In aspects, the IP related code segment comprises code that the owner wishes to protect from tampering by third parties (e.g., protect from reverse engineering by competitors, hackers, etc.). In embodiments, identification of IP related code segments is received with the software application at step 300. In aspects, an owner or developer of the software application manually identifies one or more portions of the software application code considered of value to the owner, and provides those portions of the software application to the development server 60 as IP related code segments. In embodiments, the software application is tagged using a developer code tagging technique to identify IP related code segments of the software application, and the development server 60 identifies the IP related code segments utilizing code tags in the software application.

At step 302, the development server 60 converts the IP related code segment identified at step 301 to a syntax tree, including complete information regarding the software application's data and control flow. The term syntax tree as used herein refers to a tree representation of an abstract syntactic structure of source code of the software application. In aspects, the refactoring module 70 of the development server 60 performs step 302. Step 302 may be performed utilizing syntax tree generation techniques and tools.

At step 303, the development server 60 segregates the IP related code segments into code clusters, including a native code cluster and a non-native code cluster. The term native code cluster as used herein refers to a software code cluster configured to be run on a client device 62 (e.g., platform-dependent parts of the software application, native application program interfaces (APIs), hardware dependent APIs, etc.). The term non-native code cluster as used herein refers to a software code cluster configured to be run outside of a client device 62 (e.g., non-platform dependent parts of the software application). In aspects, the non-native code clusters of the present invention are configured to be run by the security server 61. In embodiments, the refactoring module 70 performs step 303.

At step 304, the development server 60 identifies and defines interactions between the native code clusters and the non-native code clusters. In embodiments, the refactoring module 70 performs step 304. Software development tools and procedures may be utilized by the development server 60 in the implementation of step 304.

At step 305, the development server 60 refactors (restructures) the non-native code cluster identified at step 303 into one or more stand-alone portable components (SPCs), with stubs to connect to a client from a main code stream. In aspects, this step is performed concurrently with step 303. The term SPC as used herein refers to software code (e.g., non-native code clusters) configured to run independently. In aspects, a non-native code cluster SPC runs on the security server 61 and communicates with a native code cluster on the client device 62 through created stubs.

At step 306, the development server 60 determines code migration scores for the SPCs of step 305, wherein the code migration scores indicate the desirability of migrating a portion of the software application (non-native code) to a server remote (e.g., security server 61). In aspects, the performance module 71 of the development server 60 performs step 306. The manner in which the development server 60 determines code migration scores will now be discussed with reference to substeps 306A-306C of FIG. 3.

At substep 306A, the development server 60 pushes one or more SPCs generated at step 305 to the virtual server 72 of the development server 60 for testing. In embodiments, one or more native code clusters are configured to be run by the development server 60 while non-native code cluster SPCs are configured to be run on the virtual server 72, thereby simulating a real-world environment where the software application at issue includes non-native code running on a security server 61 (e.g., a cloud-based server) and native code running on a client device 62 in communication with the security server 61.

At substep 306B, the development server 60 derives a performance loss score (PLS) due to the migration of the one or more SPCs to the virtual server 72. In embodiments, the development server 60 determines PLS by comparing performance parameters or metrics (e.g., average response time) of the original software application (as received at step 300) with those of a modified version of the software application (wherein the software code has been segregated into native code clusters and non-native code clusters). Application monitoring methods and tools may be utilized to determine differences between performance metrics of the original software application and performance metrics of the modified version of the software application. The PLS may be derived using mathematical formulas, such as adding the differences in performance metrics to obtain a final number representing the PLS.

At substep 306C, the development server 60 determines an IP gain score (IPGS). In embodiments, the development server 60 determines the IPGS by creating a representation of an SPC of interest using conceptual similarity representation, and comparing the representation of the SPC to at least one source code repository (e.g., an open source repository) to determine if any code clusters or snippets in the code source repository are the same or similar to the code of the representation of the SPC. In aspects, the IPGS is based on the number of similar code clusters. In embodiments, the more source code matches that are found between the representation of the SPC and code in the source code repository, the lower the IP score. Thus, the more distinctive an IP related code segment, the higher the IPGS ratings.

At step 307, the development server 60 determines SPCs to be migrated to the security server 61 (final SPCs) based on the code migration scores determined at step 306. In embodiments, the development server 60 correlates the IPGS with the PLS and automatically determines whether to proceed with the modified software application based on predefined rules. In aspects, predefined threshold values regarding a mathematical relationship between IPGS and PLS define whether to automatically proceed with the modified software application or to utilize the original software application.

At step 308, the development server 60 refractors IP related code segments of the software application of interest into one or more final SPCs, including one or more non-native code clusters of the software application of interest. In embodiments, the development server 60 generates stubs, which enable the SPCs to communicate with native code clusters on the client device 62.

Optionally, at step 309, the development server 60 sends the final SPCs of step 308 to a remote server (e.g., security server 61), wherein the final SPCs are based on the code migration scores of step 306. In aspects, the security server 61 is a cloud-based server configured to provide anti-tampering software services to one or more client devices 62 via the network 55. In alternative embodiments, the development server 60 acts as a security server to provide anti-tampering software services to one or more client devices 62, wherein the final SPCs are stored at the development server 60. Advantageously, embodiments of the present invention generate final SPCs only when the trade-off between PLS and IPGS is at an acceptable threshold value in accordance with step 307 of FIG. 3 In aspects, the invention results in code refactoring to protect IP of the code without losing performance of the software application of interest.

Figure 4:
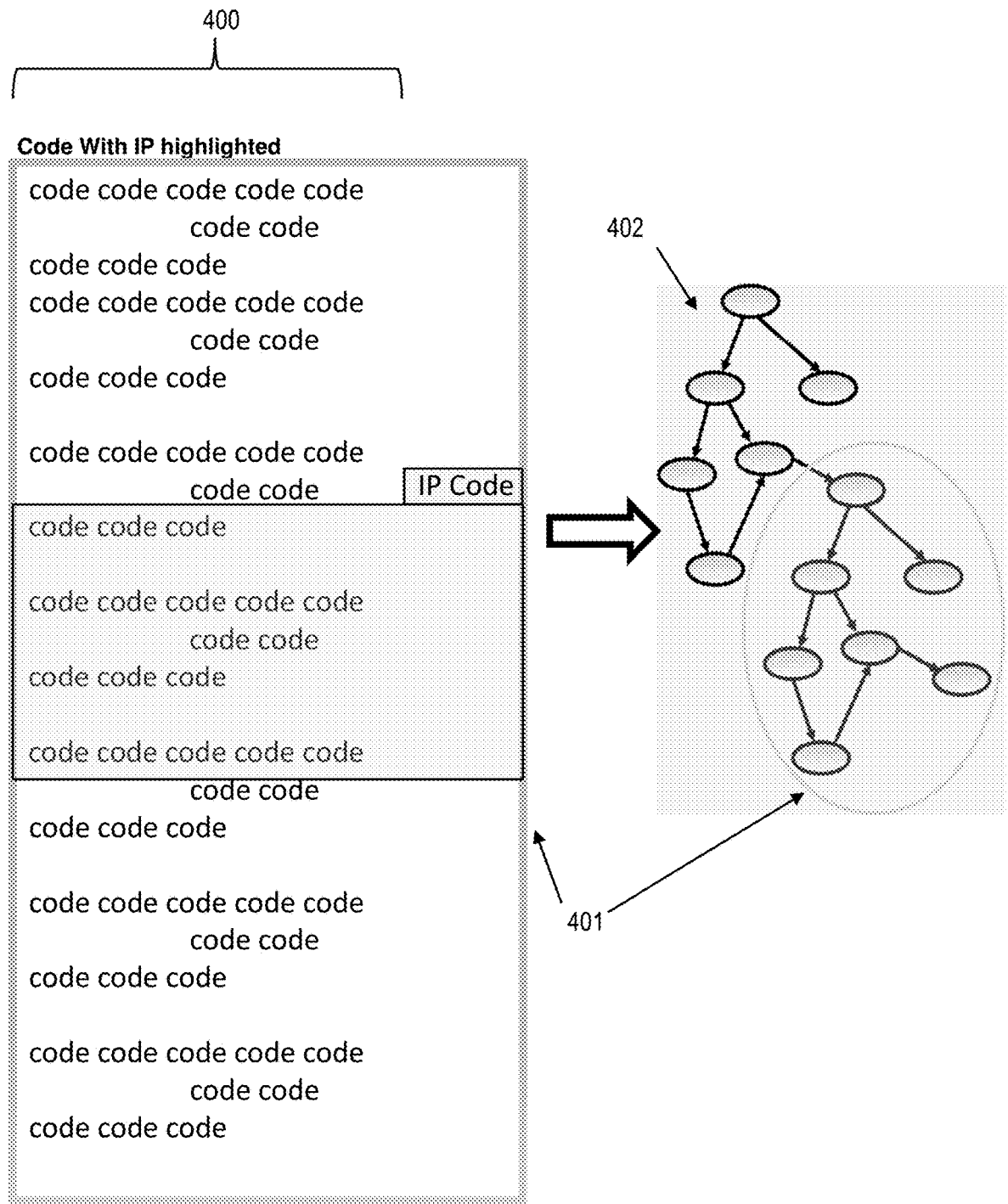
FIG. 4 illustrates the identification of intellectual property (IP) related code segments for processing in accordance with embodiments of the invention.

FIG. 4 illustrates the identification of intellectual property (IP) related code segments for processing in accordance with embodiments of the invention. Software code 400 is shown including an IP related code segment 401. The IP related code segment 401 may be identified manually (e.g., by software developers), or utilizing software tools to identify potentially new/novel portions of code which may be valuable to an owner. In embodiments, the development server 60 of FIG. 2 receives the identified IP related code segment 401 in accordance with step 301 of FIG. 3, and converts the IP related code segment 401 into a syntax tree 402 in accordance with step 302 of FIG. 3.

Figure 5A:
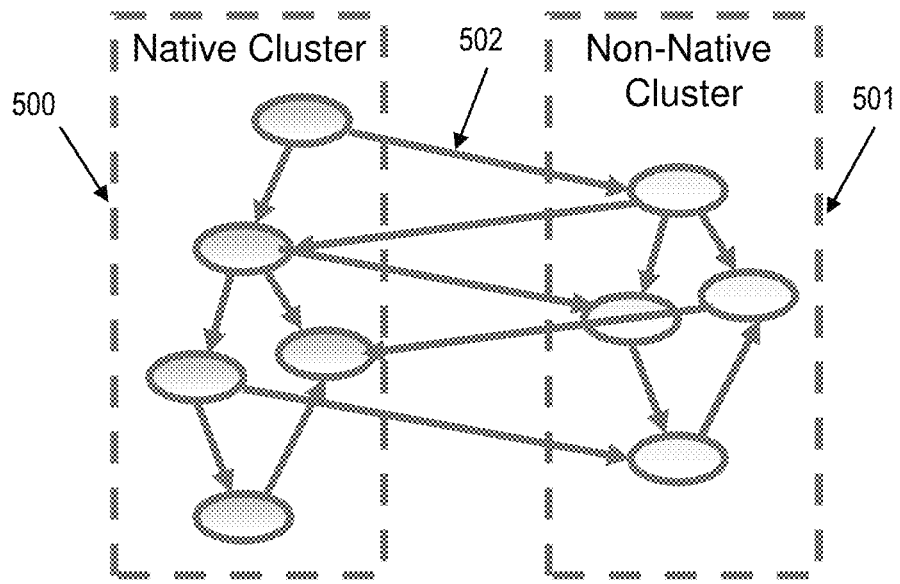
FIG. 5A illustrates the segregation of IP related code segments into non-native software code clusters and native clusters in accordance with embodiments of the invention.

FIG. 5A illustrates the segregation of IP related code segments into non-native software code clusters and native clusters in accordance with embodiments of the invention. As depicted, a native software code cluster 500 is shown segregated from a non-native code cluster 501. The interactions 502 between the clusters are identified and defined in accordance with step 304 of FIG. 3 are depicted at 502.

Figure 5B:
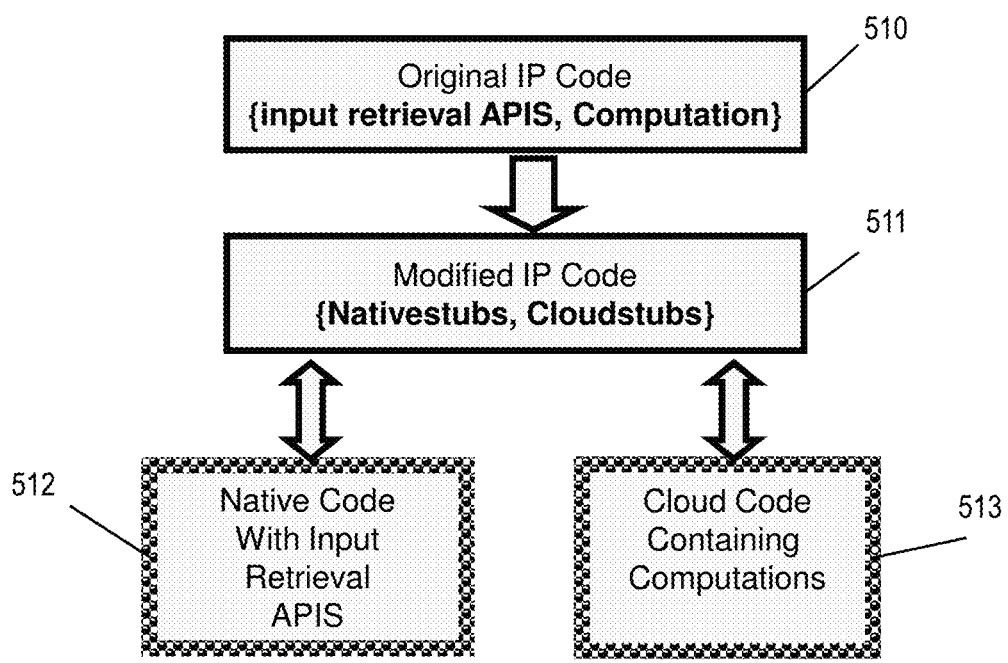
FIG. 5B shows a code transformation model in accordance with aspects of the invention.

FIG. 5B shows a code transformation model in accordance with aspects of the invention. As illustrated, at 510 original software code (e.g., software application of interest) is received at a client device (e.g., client device 62 of FIG. 2) in accordance with step 300 of FIG. 3. At 511, the development server 60 modifies the original software code to produce modified software code with native stubs and cloud stubs. The development server 60 further segregates the original software code into native code with input retrieval APIs 512 and cloud code containing computations 513.

Figure 6:
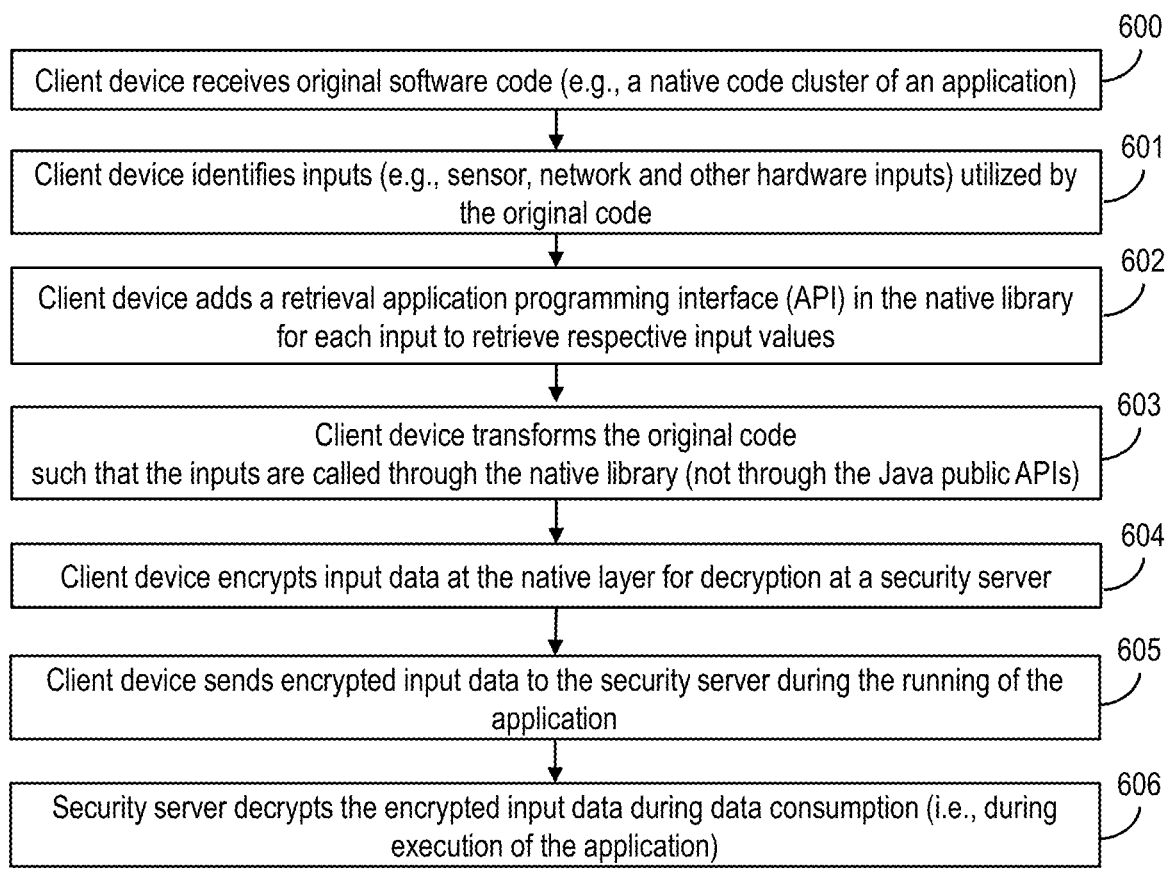
FIG. 6 shows a flowchart of steps of a method implemented by a client in accordance with aspects of the invention.

FIG. 6 shows a flowchart of steps of a method implemented by a client in accordance with aspects of the invention. Steps of the method of FIG. 6 may be performed in the environment illustrated in FIG. 2, and are described with reference to elements shown in FIG. 2.

At step 600, a client device 62 receives original software code. In embodiments, the original software code comprises one or more native code clusters (hereafter native code) of a software application (e.g., the application of interest of step 300 of FIG. 3), wherein the software application is segregated into the native code and one or more non-native code clusters (e.g., the final SPCs generated at step 308 of FIG. 3). In embodiments, the native code is received from the development server 60 via the network 55.

At step 601, the client device 62 identifies hardware inputs (e.g., sensor, network and other hardware inputs) utilized by the original software code received at step 600. In embodiments, the security module 76 of the client device 62 identifies input retrieval application program interfaces (APIs) related to the original software code.

At step 602, the client device 62 configures (adds) input retrieval APIs in the native library 77 (for each platform) for each input identified at step 601, to enable retrieval of input values of the respective inputs. In aspects, the security module 76 of the client device 62 configures input retrieval APIs in the native library 77, using templates that correspond to the input retrieval APIs identified at step 601.

At step 603, the client device 62 transforms the original software code (e.g., native code) such that the inputs identified at step 601 are called through the native library by the client device 62. In embodiments, code for retrieving sensor and hardware inputs at a native layer through a communication model (e.g., Java Native Interface (JNI) or sockets) is utilizing to implement a Java to C/C++ programing language transformation of the original software code to modified software code. In aspects, the modified software code results in inputs that are called through the native library, not through Java public APIs (as was previously done). Accordingly, input retrieval APIs at the native library are accessible by the software application through a communication module. While Java bytecode can be reverse engineered (as it is in an intermediate form), native library distributed shared object (.so) files cannot be reverse engineered, as they are at the machine code level. Thus, embodiments of the invention constitute an improvement over systems utilizing Java bytecode.

Optionally, at step 604, the client device 62 encrypts input data at the native layer, for decryption at a security server (e.g., security server 61 or development server 60 acting as a security server). In aspects, the security module 76 of the client device performs step 604. In embodiments, the security module 76 transforms input data at the native layer to morph the standard characteristics of the data. In aspects, the security module 76 analyzes the format of the input data to determine a type of data (e.g., global positioning system (GPS) data, Wi-Fi data, etc.) to be transformed. The security module 76 then transforms the input data from an original data format to an encrypted format, resulting in encrypted input data. The encrypted input data is configured to be re-transformed back to the original data format at the security server (e.g., security server 61 or development server 60 acting as a security server) during data consumption (execution of the software application).

At step 605, during execution of the software application, the client device 62 sends the encrypted input data of step 604 to the security server (e.g., security server 61 or development server 60 acting as a security server). In embodiments, the security module 76 sends the encrypted input data to the software code module 73 of the security server 61 or the software code module 79 of the development server 60.

At step 606, the security server (e.g., security server 61 or development server 60 acting as a security server) receives the encrypted input data from the client device 62 via the network 55, and decrypts the encrypted input data to obtain input data in its original data format. In embodiments, the decryption module 74 of the security server 61, or the decryption module 80 of the development server 60, decrypts the encrypted input data to obtain the input data in its original data format, wherein the input data may be utilized by the security server (e.g., security server 61 or development server 60) in the execution of the software application.

In aspects, the type of data to be transformed at step 603 is predetermined based on the level of risk such data represents with respect to reverse engineering of the software application. For example, if a protected IP code is an energy efficient mechanism to locate user coordinates, then the data inputs used by the IP code such as GPS, Wi-Fi and telephony data must be hidden, as the data inputs, and the manner in which the data inputs are utilized by the IP code, say a lot about the mechanism used by the IP code. Previously, code-obfuscating techniques have been utilized to make protected IP code unreadable by renaming variables, class names, etc. Such techniques do not rename public APIs provided by the operating system (OS), as doing so leads to crashing of the application. An example of code obfuscation is shown below.

TABLE

| Code Obfuscation Example | |
|---|---|
| Original Code | Obfuscated Code |
| int getCoordinates( ) { int getGPSValue; getGPSValue = GpsManager.getLocationAttributes( ): } | int 9cdsds( ) { Int Za86; Za86 = GpsManager.getLocationAttribtributes( ); } |

Code obfuscation techniques obfuscate user code as well as OS library code. Drawbacks of such techniques include the need for OS support and customization. Another technique previously utilized to protect IP code generates the code at run-time and executes it. Drawbacks to such run-time code generation techniques include heavy performance overhead. Migration of the entire IP code to the native layer is undesirable for at least the reasons that: transforming any Java code to C/C++ programming language is not trivial; and such migration would increase the size of the package file format used for distribution and installation of the application to a great extent, as native library for all platforms has to be packaged in the package file. Advantageously, embodiments of the invention port IP input retrieval APIs to the native layer; this makes the code transformation relatively simple and does not increase the size of the package file format significantly.

Figure 7:
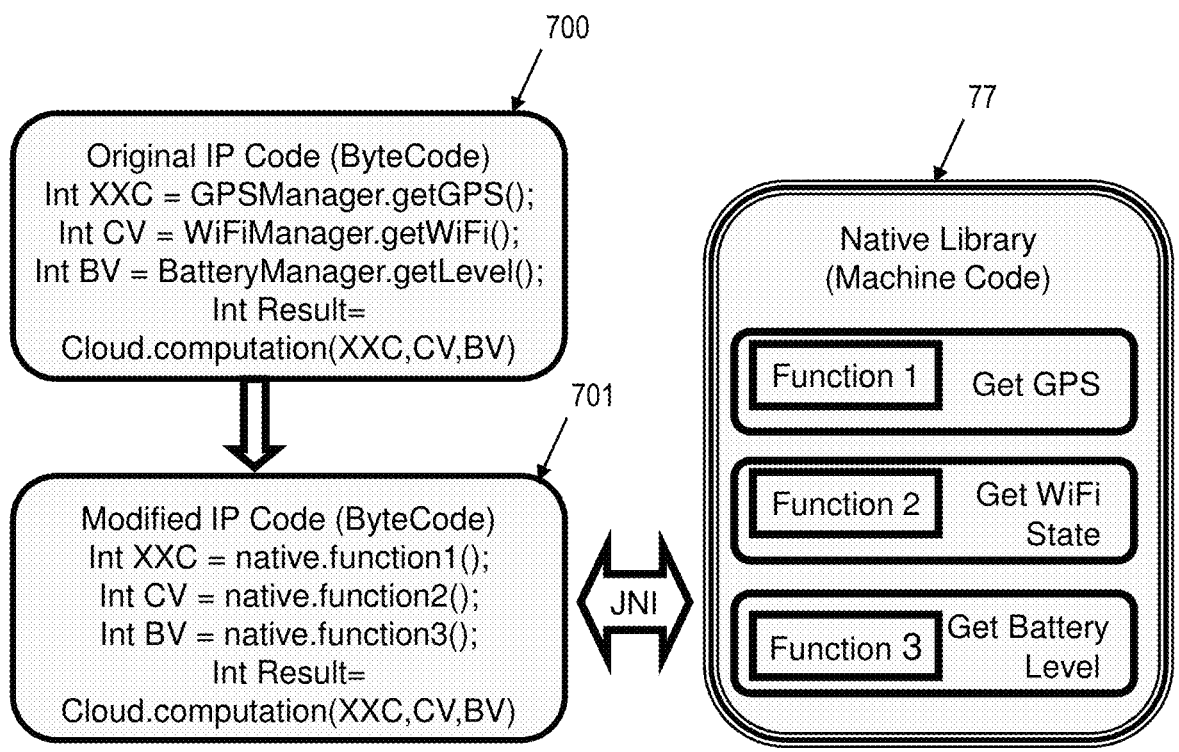
FIG. 7 is an exemplary diagram of a method of hiding inputs in accordance with embodiments of the invention.

FIG. 7 is an exemplary diagram of a method of hiding inputs in accordance with embodiments of the invention. In the example of FIG. 7, it can be seen that original IP code indicated at 700 (e.g., code received at step 600 of FIG. 6) is modified by a client device (e.g., client device 62) to produce modified IP code 701, wherein inputs are called through a native library 77. In the illustrated example of FIG. 7, it can be seen that a code segment "GPSManager.getGPS( )" associated with GPS inputs is transformed/replaced with a call ("native.function1( )") to Function 1 of the native library 77 in accordance with step 603 of FIG. 3. Similarly, a code segment "WiFiManager.getWiFi( )" associated with Wi-Fi inputs is transformed/replaced with a call (native.function2( )") to Function 2 of the native library 77, and a code segment "atteryManager.getLevel( )" associated with battery inputs is transformed/replaced with a call (native.function3( )") to Function 3 of the native library 77.

Based on the above, it can be understood that embodiments of the present invention provide a unique hybrid approach of moving IP-input retrieval APIs to the native layer and IP-computations to the cloud based on performance-IP trade-offs. Additionally, IP input retrieval APIs are auto-coded in the native layer to prevent data format leaks (whereby keys are obtained via a handshake between the native layer and the cloud layer).

In embodiments, a service provider could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for preventing mobile application tampering. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, by a computing device, an intellectual property (IP) related software code segment of a software application to be protected;
   segregating, by the computing device, the IP related software code segment into one or more native code clusters and one or more non-native code clusters;
   refactoring, by the computing device, the one or more non-native code clusters into one or more stand-alone portable components (SPCs) configured to run independently, thereby generating a modified version of the software application;
   determining, by the computing device, differences between performance metrics from running the software application and performance metrics from running the modified version of the software application by comparing the performance metrics from running the software application with the performance metrics from running the modified version of the software application;
   determining, by the computing device, code migration scores for the one or more SPCs based on the determined differences, wherein the code migration scores indicate a desirability of migrating the one or more SPCs to a server; and
   determining, by the computing device, select SPCs from the one or more SPCs to migrate to a remote security server based on the code migration scores and predefined rules.

2. The computer-implemented method of claim 1, further comprising sending, by the computing device, the select SPCs to the remote security server.

3. The computer-implemented method of claim 1, further comprising:
   converting, by the computing device, the IP related software code segment to a syntax tree, wherein the segregating the IP related software code segment is based on the syntax tree; and
   identifying and defining, by the computing device, interactions between the one or more non-native code clusters and the one or more native code clusters, wherein the refactoring the IP related software code segments is based on the identifying and the defining.

4. The computer-implemented method of claim 1, wherein the one or more SPCs comprises stubs to connect the one or more native code clusters with the one or more non-native code clusters.

5. The computer-implemented method of claim 1, wherein the determining the code migration scores for the one or more SPCs further comprises:
   migrating, by the computing device, the one or more SPCs to a virtual server;
   determining, by the computing device, a performance loss score for the software application due to the migrating of the SPCs to the virtual server; and
   deriving, by the computing device, an IP gain score by comparing the one or more SPCs with code segments in an open source repository using conceptual similarity code representation,
   wherein the determining the code migration scores for the one or more SPCs is further based on the IP gain score.

6. The computer-implemented method of claim 1, wherein the software application is a mobile device application.

7. A computer program product comprising a computer readable storage medium having program instructions embodied therewith, the program instructions executable by a computing device to cause the computing device to:
identify hardware data inputs utilized by an original software application comprising one or more native code clusters and one or more non-native code clusters located on a remote security server in communication with the computing device;
add retrieval application programing interfaces (APIs) in a native library of the computing device for each of the hardware data inputs; and
transform the original software application to a modified software application, wherein hardware data inputs are called through the native library of the computing device during an execution of the modified software application.

8. The computer program product of claim 7, wherein the program instructions further cause the computing device to encrypt the hardware data inputs, resulting in encrypted hardware input data configured to be decrypted by the remote security server.

9. The computer program product of claim 8, wherein the program instructions further cause the computing device to send the encrypted hardware input data to the remote security server during the execution of the modified software application.

10. The computer program product of claim 7, wherein the hardware data inputs are selected from the group consisting of: global positioning system inputs, battery management inputs, Wi-Fi inputs, telephony inputs, sensor inputs, and combinations thereof.

11. The computer program product of claim 7, wherein transforming the original software application comprises converting a java programing language to a C or C++ programing language, wherein hardware data inputs are called through a java native interface in the original software application during an execution of the original software application, and hardware data inputs are called through the native library of the computing device during the execution of the modified software application.

12. The computer program product of claim 7, wherein the original software application is a mobile device application.

13. A system comprising:
a processor, a computer readable memory and a computer readable storage medium associated with a computing device;
program instructions to identify an intellectual property (IP) related software code segment of a software application to be protected;
program instructions to segregate the IP related software code segment into one or more native code clusters and one or more non-native code clusters;
program instructions to refactor the one or more non-native code clusters into one or more stand-alone portable components (SPCs) configured to run independently, thereby generating a modified version of the software application;
program instructions to determine differences between performance metrics from running the software application and performance metrics from running the modified version of the software application by comparing the performance metrics from running the software application with the performance metrics from running the modified version of the software application;
program instructions to determine code migration scores for the one or more SPCs based on the determined differences, wherein the code migration scores indicate a desirability of migrating the one or more SPCs to a server; and
program instructions to determine select SPCs from the one or more SPCs to maintain in a cloud environment separate from the one or more native code clusters based on the code migration scores and predefined rules,
wherein the program instructions are stored on the computer readable storage medium for execution by the processor via the computer readable memory.

14. The system of claim 13, further comprising:
program instructions to convert the IP related software code segment to a syntax tree, wherein the segregating the IP related software code segment is based on the syntax tree; and
program instructions to identify and define interactions between the one or more non-native code clusters and the one or more native code clusters, wherein the refactoring the IP related software code segments is based on the identifying and the defining.

15. The system of claim 13, wherein the one or more SPCs comprises stubs to connect the one or more native code clusters with the one or more non-native code clusters.

16. The system of claim 13, wherein the program instructions to determine the code migration scores for the one or more SPCs further comprises:
program instructions to migrate the one or more SPCs to a virtual server;
program instructions to determine a performance loss score for the software application due to the migrating of the SPCs to the virtual server; and
program instructions to derive an IP gain score by comparing the one or more SPCs with code segments in an open source repository using conceptual similarity code representation,
wherein the determining the code migration scores for the one or more SPCs is further based on the IP gain score.

17. The system of claim 13, further comprising program instruction to send the select SPCs to a remote security server.

18. The system of claim 13, further comprising:
program instruction to receive encrypted hardware input data from a remote client device during an execution of the software application; and
program instructions to decrypt the encrypted hardware input data during the execution of the software application.

19. The system of claim 18, wherein the encrypted hardware input data is selected from the group consisting of: global positioning system data, battery management data, Wi-Fi data, telephony data, sensor data, and combinations thereof.

20. The system of claim 13, wherein the software application is a mobile device application.

* * * * *